(12) United States Patent
Giles et al.

(10) Patent No.: US 7,068,151 B2
(45) Date of Patent: Jun. 27, 2006

(54) VEHICLE SECURITY SYSTEM

(76) Inventors: Samuel K. Giles, 7312 Woodsman Cir., Holland, OH (US) 43528; Christopher E. Smith, 15501 Glynn Rd., East Cleveland, OH (US) 44112

( * ) Notice: Subject to any disclaimer, the term of this patent is extended or adjusted under 35 U.S.C. 154(b) by 0 days.

(21) Appl. No.: 10/644,572

(22) Filed: Aug. 21, 2003

(65) Prior Publication Data

US 2004/0227642 A1    Nov. 18, 2004

Related U.S. Application Data

(60) Provisional application No. 60/470,566, filed on May 14, 2003.

(51) Int. Cl.
*B60R 25/10* (2006.01)

(52) U.S. Cl. .............. 340/426.1; 340/426.13; 340/426.15; 340/426.36; 307/10.2

(58) Field of Classification Search ............... 340/426.12–426.13, 426.15, 426.17, 426.36; 307/10.2
See application file for complete search history.

(56) References Cited

U.S. PATENT DOCUMENTS

| | | | | |
|---|---|---|---|---|
| 4,523,178 A | * | 6/1985 | Fulhorst | 340/426.13 |
| 4,940,964 A | | 7/1990 | Dao | 340/438 |
| 5,331,325 A | | 7/1994 | Miller | 341/176 |
| 5,382,948 A | * | 1/1995 | Richmond | 340/825.36 |
| 5,479,148 A | | 12/1995 | Umemoto | 340/539 |
| 5,623,245 A | * | 4/1997 | Gilmore | 340/426.12 |
| 5,652,564 A | * | 7/1997 | Winbush | 340/426.12 |
| 5,760,680 A | | 6/1998 | Hwang | 340/426.17 |
| 5,850,173 A | | 12/1998 | DiCroce et al. | 340/426 |
| 5,939,975 A | | 8/1999 | Tsuria et al. | 340/426.18 |
| 5,973,592 A | | 10/1999 | Flick | 340/426.15 |
| 6,028,506 A | | 2/2000 | Xiao | 340/426.21 |
| 6,034,593 A | | 3/2000 | Chase et al. | 340/426 |
| 6,075,454 A | | 6/2000 | Yamasaki | 340/5.61 |
| 6,107,914 A | | 8/2000 | Greene | 340/426.25 |
| 6,147,598 A | | 11/2000 | Murphy et al. | 340/426 |
| 6,155,416 A | | 12/2000 | Jaime | 206/305 |
| 6,265,987 B1 | | 7/2001 | Wang | 340/825.69 |
| 6,424,056 B1 | | 7/2002 | Irvin | 307/10.1 |
| 6,525,646 B1 | * | 2/2003 | Bartz | 340/5.72 |
| 6,734,790 B1 | * | 5/2004 | Hodger | 340/426.12 |
| 2002/0097152 A1 | | 7/2002 | Mengrone | 340/571 |
| 2002/0196132 A1 | | 12/2002 | Parker | 340/426.1 |

FOREIGN PATENT DOCUMENTS

| JP | 08120992 A | * | 5/1996 |
|---|---|---|---|
| JP | 02001032586 A | * | 2/2001 |

* cited by examiner

*Primary Examiner*—Daniel Wu
*Assistant Examiner*—Travis Hunnings (57) ABSTRACT

A remote watch (FIG. 7) design for a car security system, comprising of a display screen and base 706 with keypad 704. A user of the remote watch will not only be able to keep track of the time but also will be able to arm/lock, disarm/unlock and remotely start their vehicle by pushing specific buttons on the watch. It is common for people to lose or misplace their keys along with the keyless remote that is attached to the keys. Since the watch is placed on the users wrist, the user never has to worry about damage due to dropping it on a hard surface, in liquids (ex. water), or even losing their keyless remote as you would by having a keyless remote attached to keys or a key chain. If the user ever loses their keys, the remote watch will now allow the user to still have access to their vehicle without their keys, thus giving the user the freedom to store an extra set of keys in their vehicle in case they lose the original ones.

22 Claims, 9 Drawing Sheets

Notes:
- $P_L$ is the low voltage terminal of the switch and the $P_H$ is the high one.
- Q1 is a n-channel enhancement MOSFET

Figure 5

(A) RDS ON

(B) RDS OFF

Table 1: Output /Input Levels of EALS

| Gate | $V_{HL}$ |
|---|---|
| 0 | 1 |
| 1 | 0 |
| 1 ⇔ 3V | 0 ⇔ 3V |
| 0 ⇔ 0V | 1 ⇔ non zero |
| $V_{HL}$ = AC voltage drop from $P_H$ to $P_L$ | |
| Gate = DC voltage drop to ground | |

VEHICLE SECURITY SYSTEM

RELATED APPLICATION

Priority as claimed under 35 USC 119/e for Provisional Patent Application 60/470,566, filed May 14, 2003

SUMMARY OF INVENTION

The present invention relates to interacting with a security system through a watch interface. The watch will be comprised of a display screen(s) that will show digital read-outs of the security system's status. The invention comprises relaying regular watch functions (time, date, etc.) also on a display screen(s).

BACKGROUND

1. Field of Invention

This invention relates to security systems for vehicles and will later expand to homes. A user of the remote watch will not only be able to keep track of the time but also will be able to arm/lock, disarm/unlock and remotely start their vehicle by pushing specific buttons on the watch. It is common for people to lose or misplace their keys along with the keyless remote that is attached to the keys. Since the watch is placed on the users wrist, the user never has to worry about damage due to dropping it on a hard surface, in liquids (ex. water), or even losing their keyless remote as you would by having a keyless remote attached to keys or a key chain.

2. Prior Art (Discussion and Criticism of the Relevant Prior Art)

Some of the latest inventions in the field of car security have been the 2-way transceivers.

They comprise of:
 i. A display screen
 ii. 4 buttons
 iii. A small antennae

The 2-way transceiver remote confirms that your vehicle has received signals and alerts the user to system triggers and theft attempts. This remote can display 20 different icons including transmit, receive, remote start, arm/disarm, hood, trunk, door ajar, and extra sensors. The Auto Security Compustar is a semi-small remote start keyless entry that displays a car on the screen and shows the part of the car that is being tampered with.

These particular devices look like toys. They both still hold true to the traditional keyless entry remotes that can be attached to a key chain and possibly damaged by those people who toss their keys around and lost by those who are careless. It is also not waterproof as our invention can be and will not have the style along with convenience, as our invention will.

OBJECTIVES AND ADVANTAGES (POSITIVE ASPECTS OF INVENTION)

The advantages of this invention are:
 i. Digital or analog or a combination of digital/analog
 ii. Linking the individual to his/her vehicle at all times
 iii. Vibrates/beeping sound to alarm an individual whenever the vehicle is being tampered with and when the alarm is triggered.
 iv. The watch gives you feedback by transmitting the condition of the vehicle.
 v. This invention is located in the most convenient and easy to access area, the user's wrist. Having the device on the wrist will allow hassle-free convenient usage. Other car security devices have to be pulled out of a pocket, bag, or another area.
 vi. The watch displays the time.
 vii. Keeps track of time and a vehicle at all times.
 viii. If you loose your keys you will also loose your keyless entry alarm remote. Since the security system is located on the watch, a person does not have to worry about losing the keyless remote.
 ix. If you loose your keys then a person can feel safe about leaving a spare key in the car because they will still be able to unlock and disarm the security system from the remote watch which is worn on your wrist and not attached to the keys which can be lost.

REFERENCE NUMERALS

Figure 1:
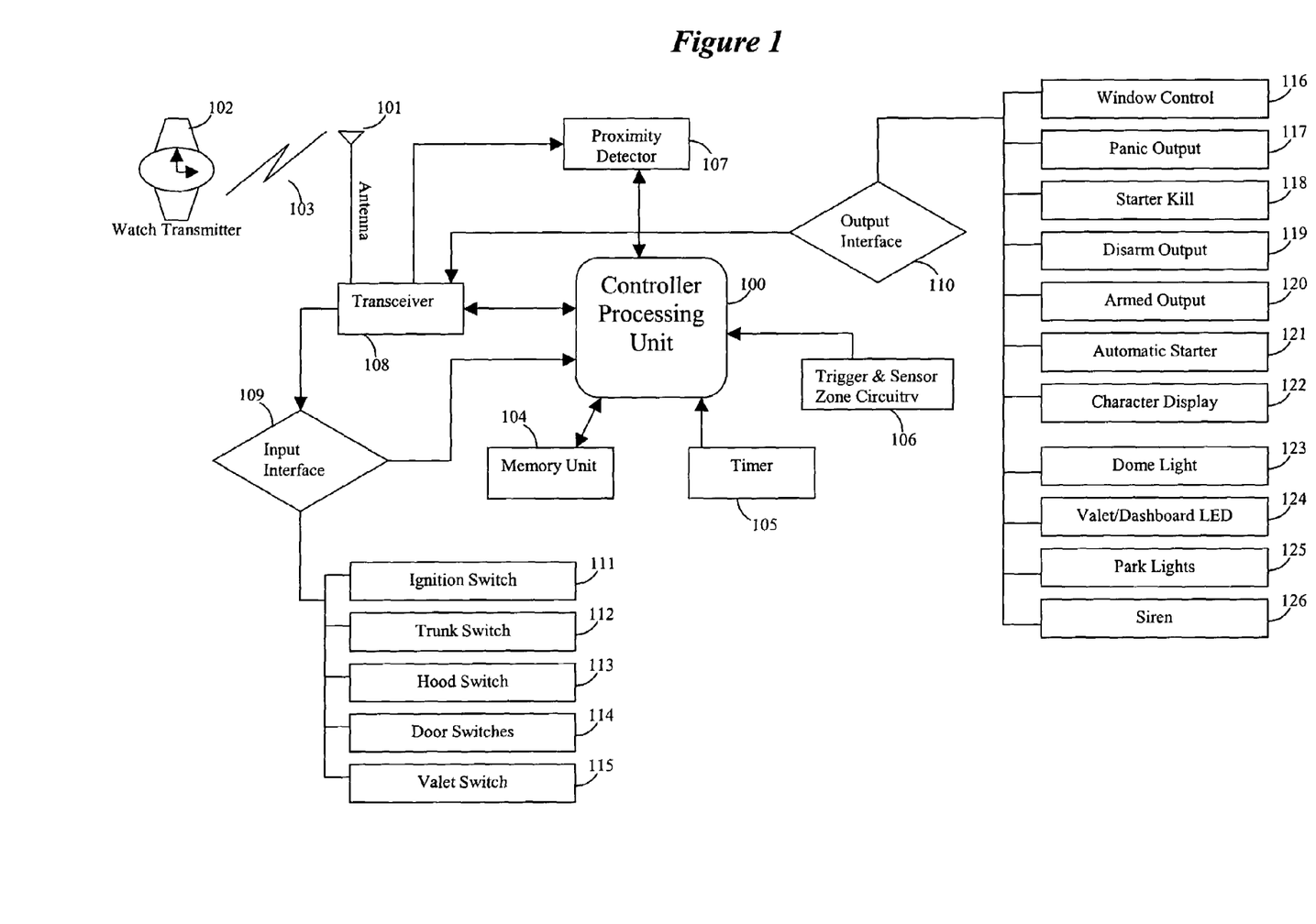
FIG. 1 Block Diagram of Digital Watch Remote Security System

Figure 1: Block Diagram of Digital Watch Remote Security System

100-Controller Processing Unit
102-Remote Watch
101-Antenna
104-Memory Unit
105-Timer
106-Trigger and Sensor Circuitry
107-Proximity Detector
108-Transceiver
109-Input Interface
110-Output Interface
111-Ingnition Switch
112-Trunk Switch
113-Hood Switch
114-Door Switch
115-Valet Switch
116-Window Control
117-Panic Output
118-Starter Kill
119-Disarm Output
120-Armed Output
121-Automatic Starter
122-Character Display
123-Dome Light
124-Valet/Dashboard LED
125-Park Lights
126-Siren
103-Operational Signal

REFERENCE NUMERALS

Figure 2:
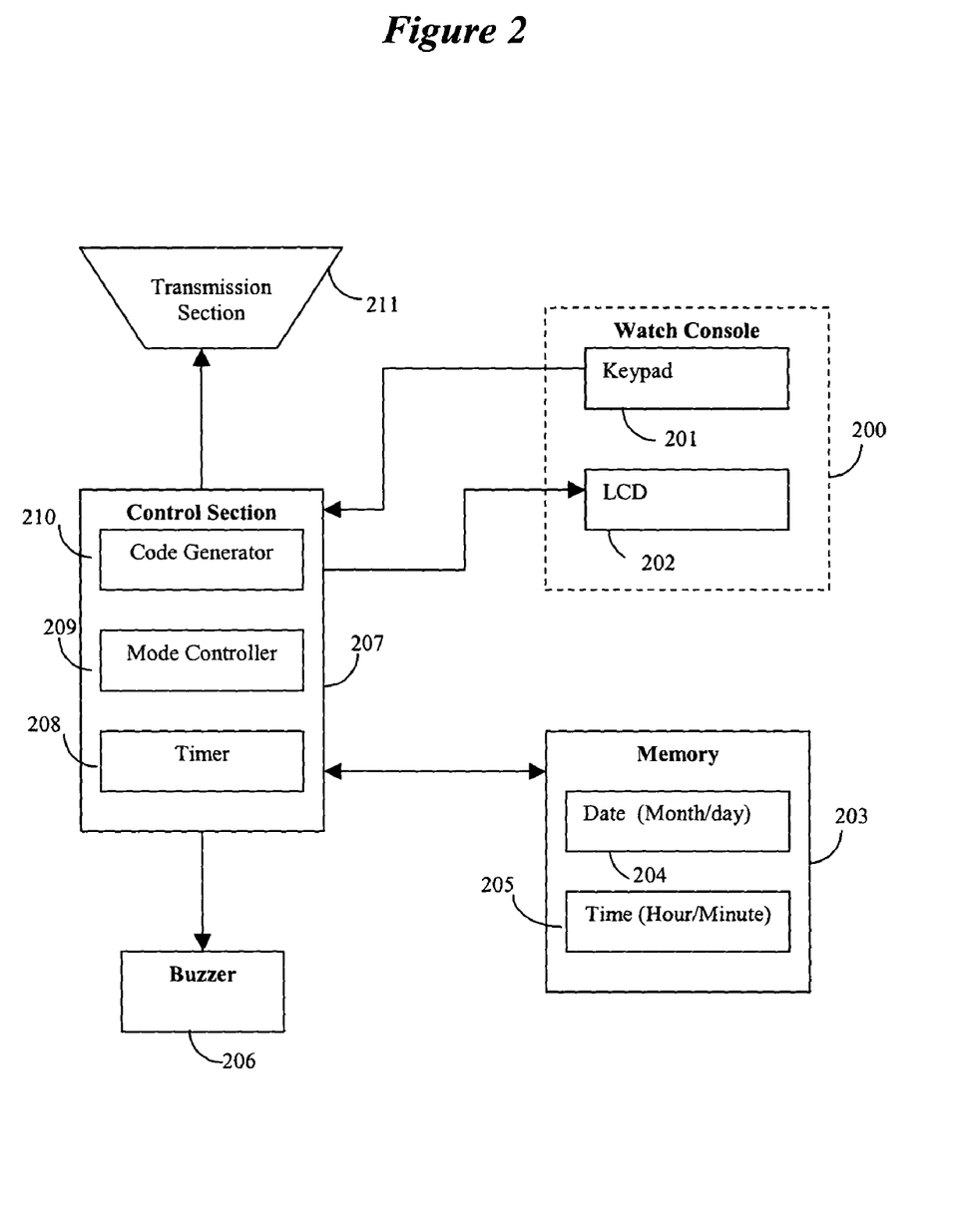
FIG. 2 Block Diagram of the Digital Watch Remote

Figure 2: Block Diagram of the Digital Watch Remote

200-Watch Remote Console
201-Keypad
202-Liquid Crystal Display
203-Memory
204-Date(Month/Day)
205-Time(Hour/Minute)
206-Buzzer
207-Control Section
208-Timer
209-Mode Controller
210-Code Generator
211-Transmission Section
212-Code Data

REFERENCE NUMERALS

Figure 3:
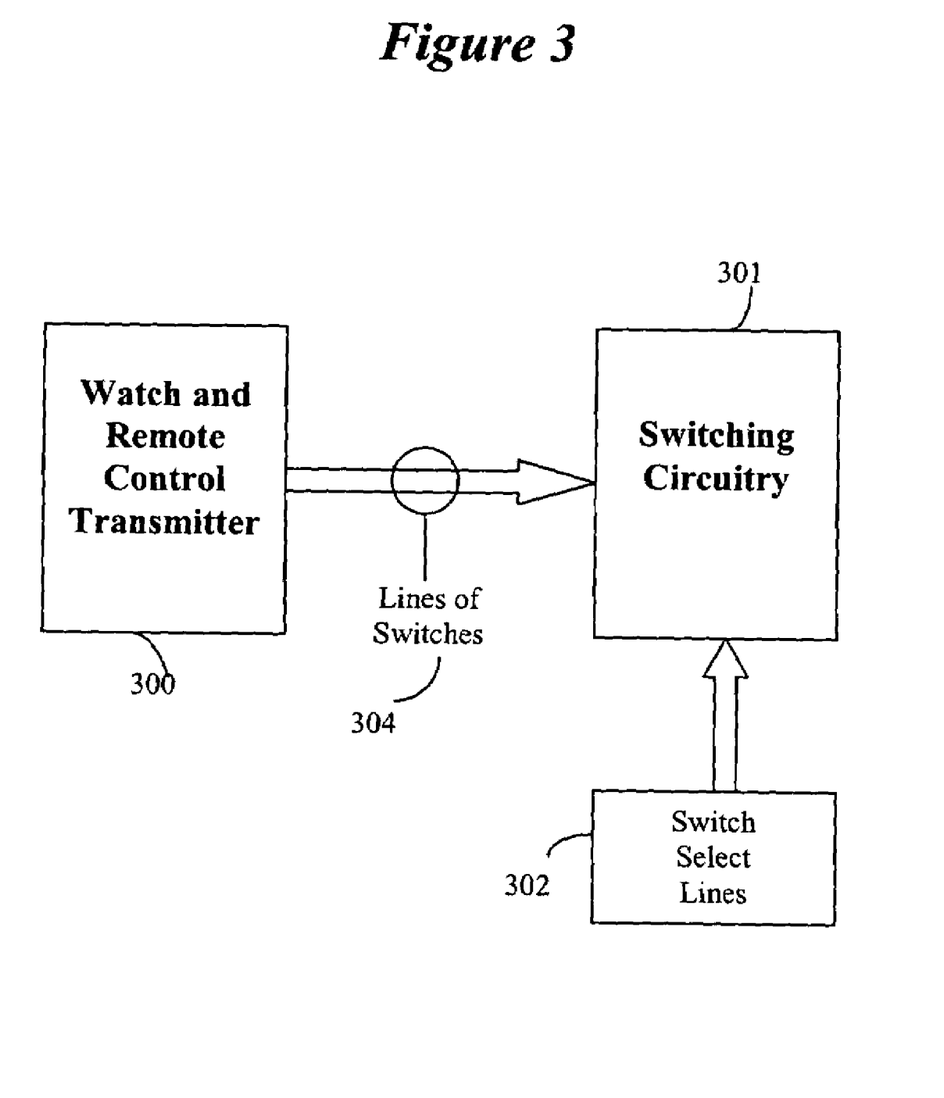
FIG. 3 Basic Outline of Switching Device

Figure 3: Basic Outline of Switching Device

300-Watch & Remote Control Transmitter
301-Switching Circuitry
302-Switch select lines
304-Swlect Switching Lines

REFERENCE NUMERALS

Figure 4:
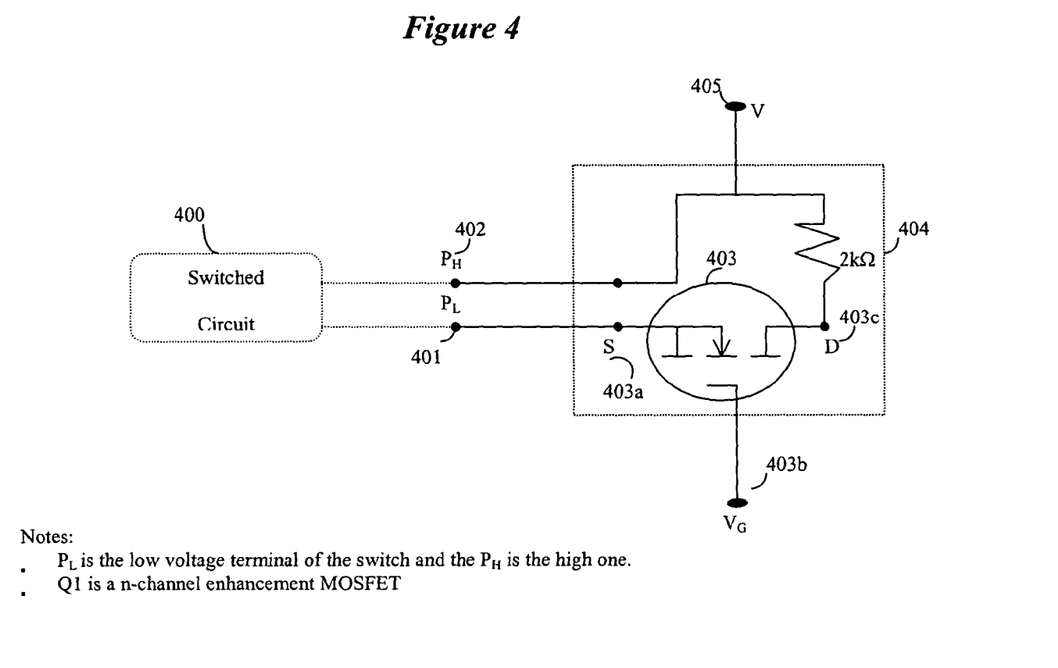
FIG. 4 EnMOSFET Switch (EACS) Diagram

Figure 4: EnMOSFET Switch

400-Switched Circuit
401-Low voltage terminal of the switch
402-High voltage terminal of the switch
403-n-channel enhancement MOSFET
403a-Source of enhancement MOSFET switch
403b-Gate of enhancement MOSFET switch
403c-Drain of enhancement MOSFET switch
404-2 kΩ Resistor
405-Power Source

REFERENCE NUMERALS

Figure 5:
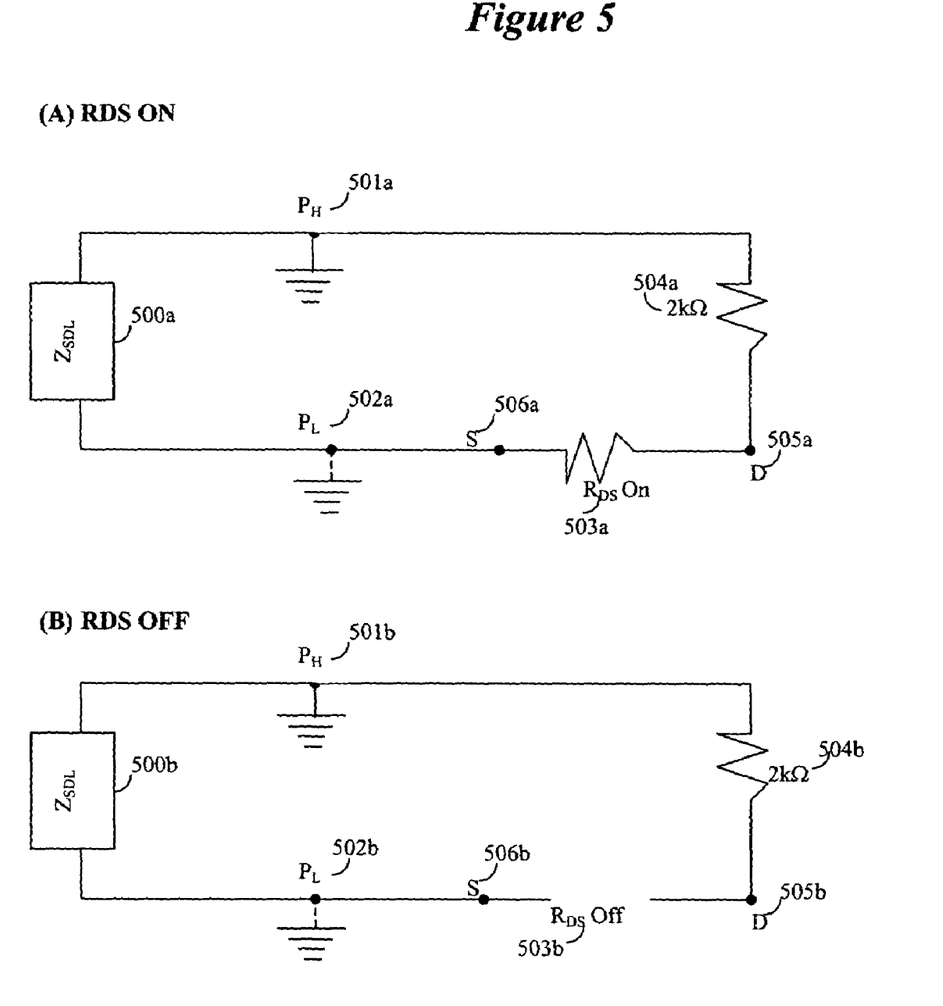
FIG. 5 Small AC Equivalent Output Circuit

Figure 5: Small AC Equivalent Output Circuit

500a-What the AC output circuit is connected to
500b-What the AC output circuit is connected to
501a-High voltage terminal of switch (on)
501b-High voltage terminal of switch (off)
502a-Low voltage terminal of switch (on)
502b-Low voltage terminal of switch (off)
503a-RDS on—On position resister
504a-2 kΩ Resistor
504b-2 kΩ Resistor
505a-Drain of enhancement MOSFET switch (on)
505b-Drain of enhancement MOSFET switch (off)
506a-Source of enhancement MOSFET switch (on)
506b-Source of enhancement MOSFET switch (off)
503b-RDS off—Off position resister

REFERENCE NUMERALS

Figure 6:
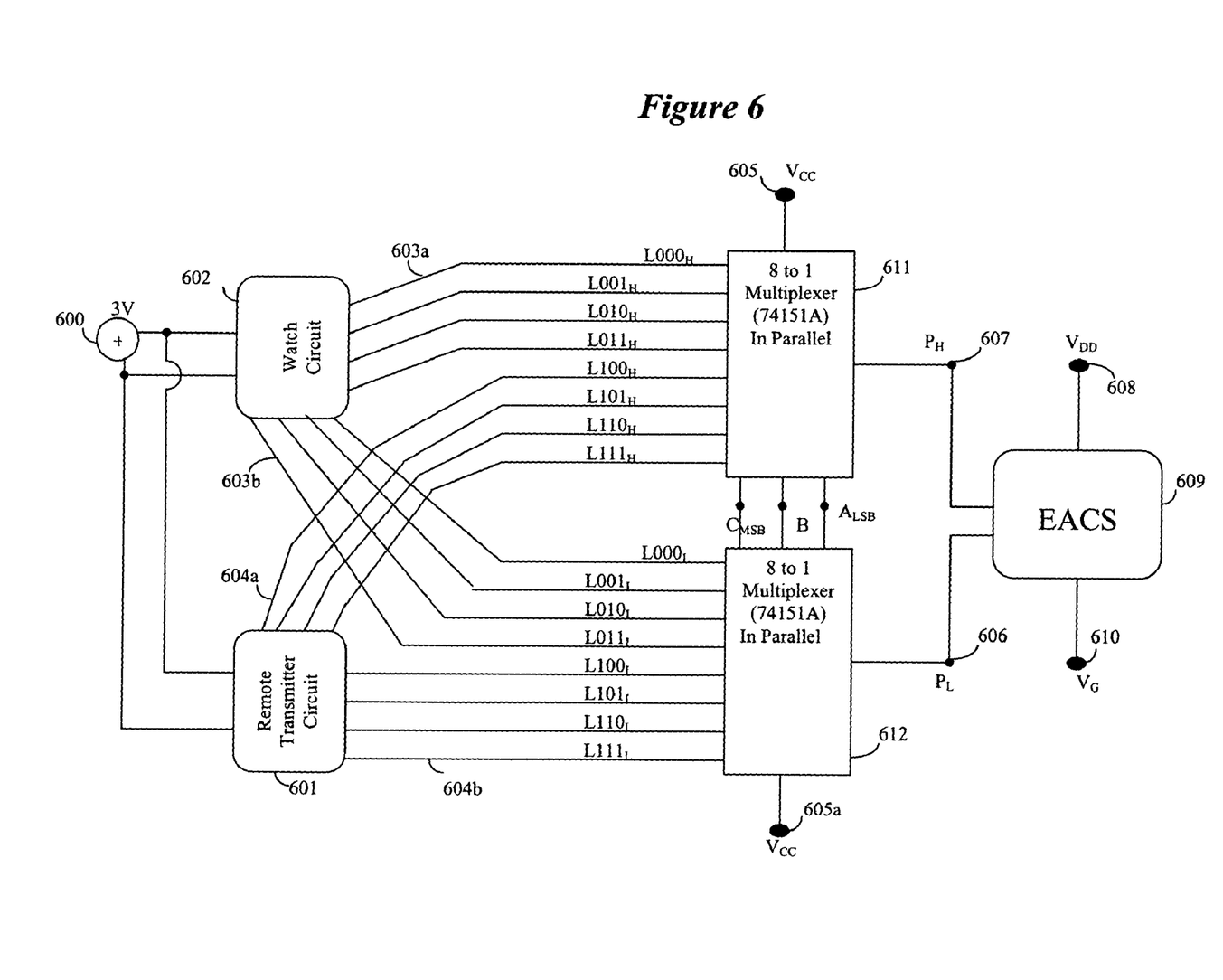
FIG. 6 Block Diagram of EACS Controlled Switch System

Figure 6: EACS Controlled Switch System 600-3V Battery voltage
601-Remote transmitter circuit
602-Watch Circuit
603a-High voltage lines for the watch circuit
603b-Low voltage lines for the watch circuit
604a-High voltage lines for the Remoter Transmitter circuit
604b-Low voltage line for the Remote Transmitter circuit
605-Voltage for High Line 8 to 1 Multiplexer
605a-Voltage for Low Line 8 to 1 Multiplexer
606-Low voltage terminal of the switch
607-High voltage terminal of the switch
608-Voltage for EACS Switch
609-EACS Switch
610-Gate of EACS switch
611-High Line 8 to 1 Miltiplexer
612-Low Line 8 to 1 Multiplexer

REFERENCE NUMERALS

Figure 7:
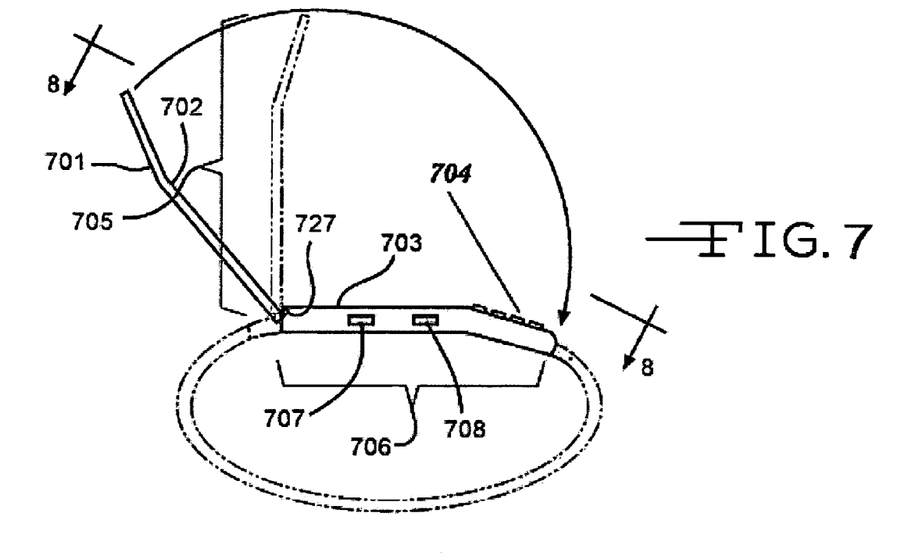
FIG. 7 Side view of the watch, which is a basic means for controlling the security system.

Figure 7: Flip-up Watch Remote Drawing

701-Exterior Digital Clock
702-Interior Display Screen
703-Interior Display Screen
704-Keypad
727-Hinge
705-Hinged Body
706-Base
707-Mode Button
708-Select Button

REFERENCE NUMERALS

Figure 8:
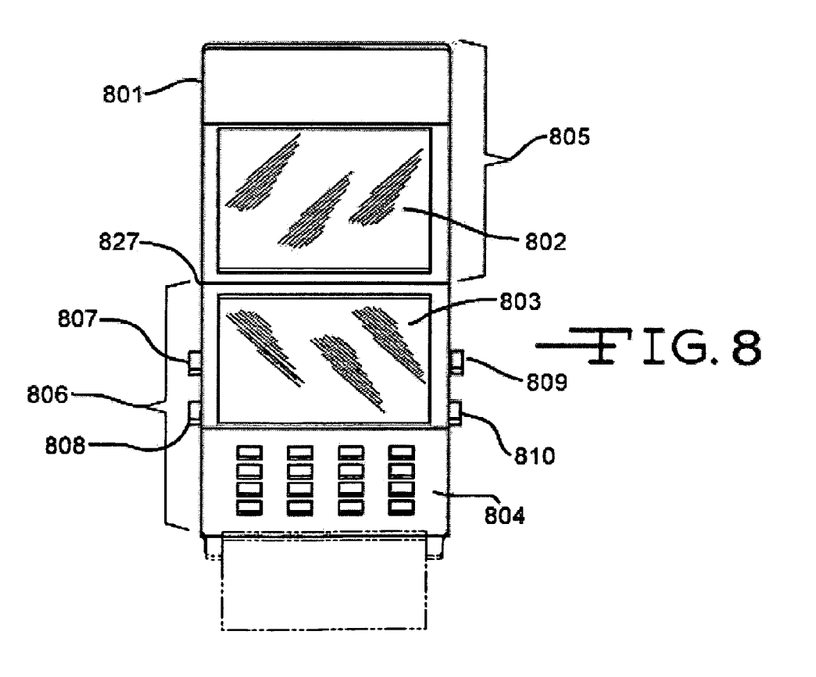
FIG. 8 Frontal/top view of the means for controlling the security system.

Figure 8: Flip-up Watch Remote Drawing

801-Exterior Digital Clock
802-Interior Display Screen
803-Interior Display Screen
804-Keypad
805-Hinged Body
806-Base
807-Mode Button
808-Select Button
809-Light
810-Hinged Body Open Button

REFERENCE NUMERALS

Figure 9:
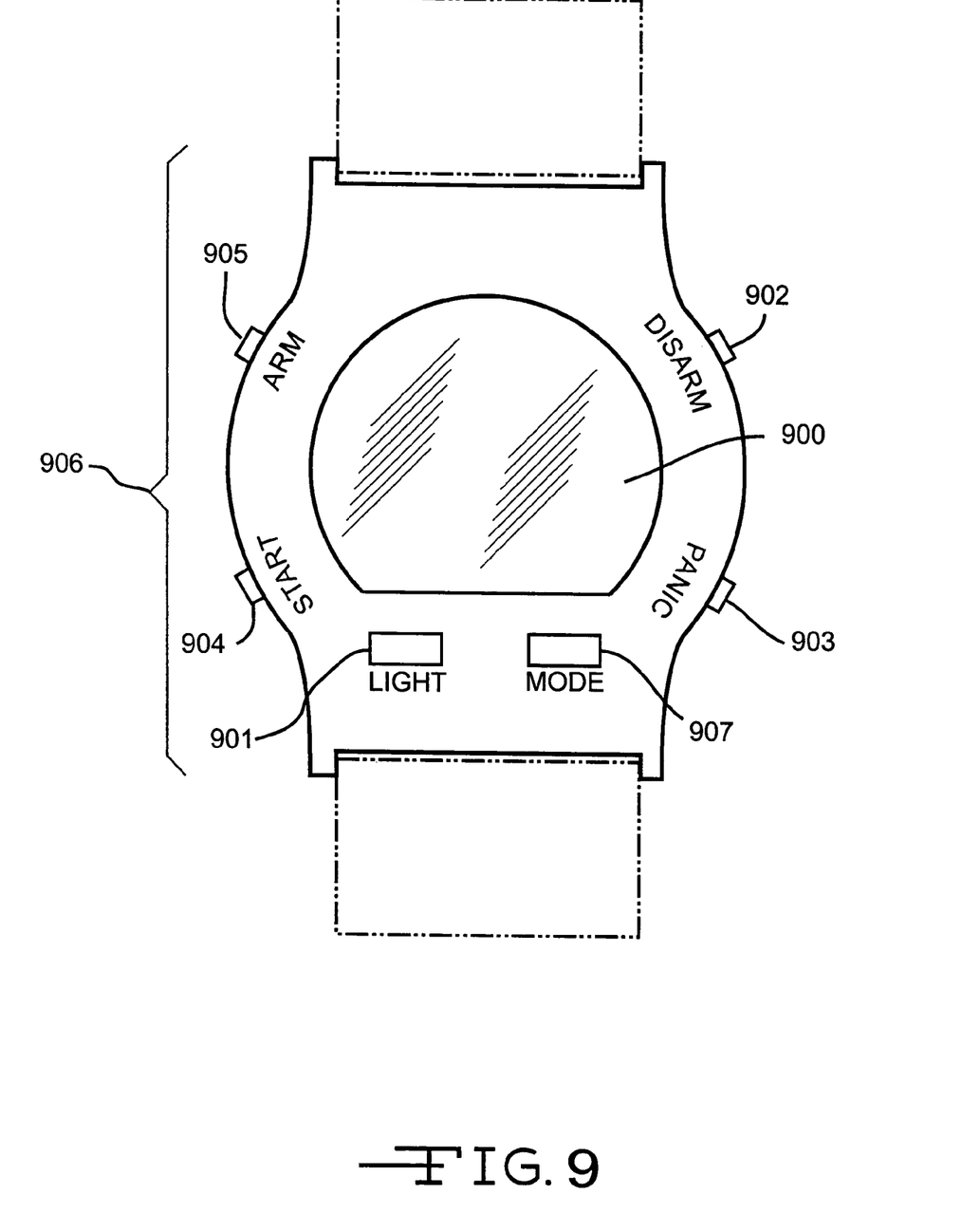
FIG. 9 Frontal and side view of a prototype means for controlling the security system.

Figure 9: Basic Watch Remote Drawing 900-display screen
901-light
902-disarm/unlock
903-panic
904-remote start
905-arm/lock
906-base
907-mode

REFERENCE NUMERALS

Figure 10:
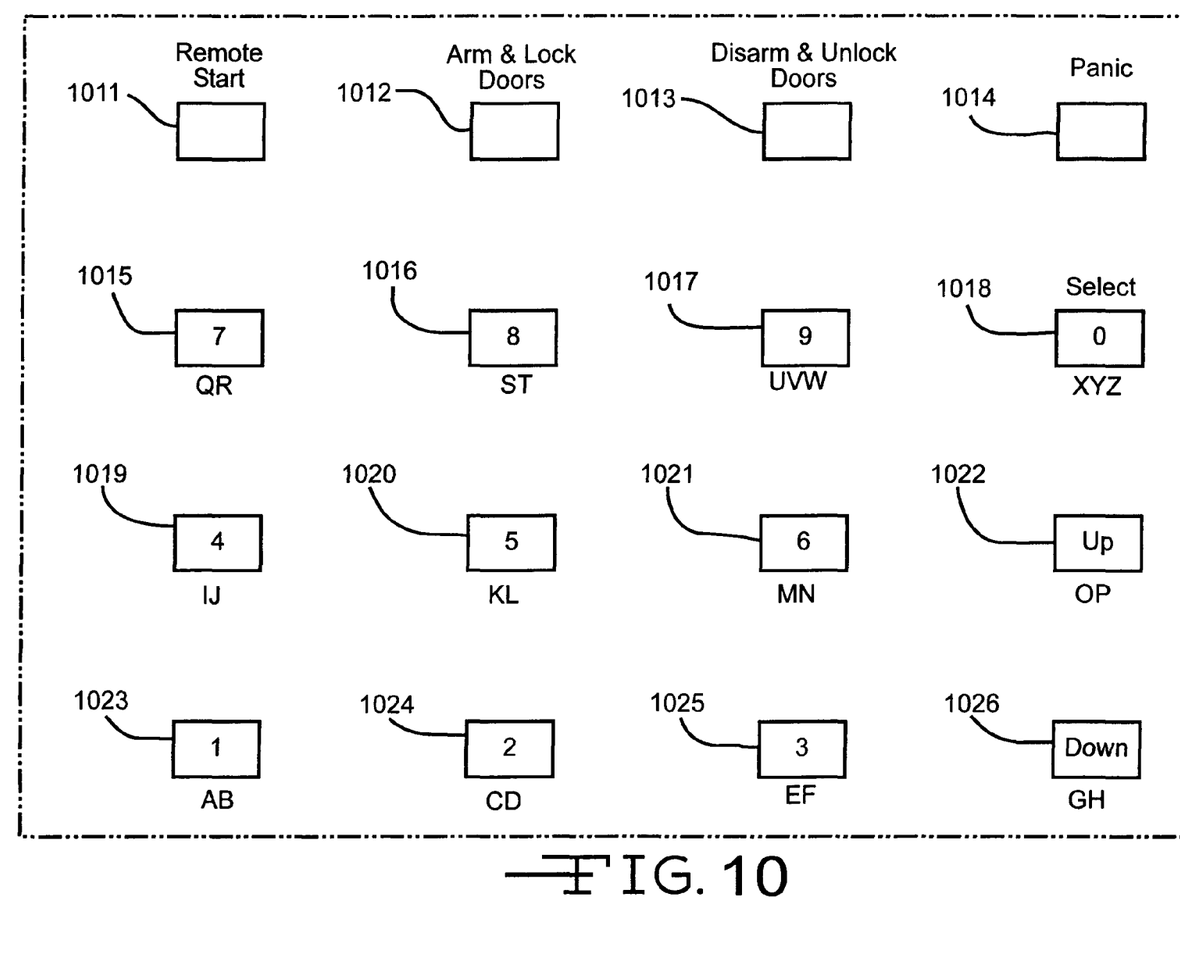
FIG. 10 Frontal view of the means for controlling the security system.

Figure 10: Keypad Description of Watch Remote 1011-remote start
1012-arm/lock doors
1013-disarm/unlock doors
1014-panic
1015-numeric 7/letters Q,R 1016-numeric 8/letters S,T
1017-numeric 9/letters U,V,W
1018-numeric 0/letters X,Y,Z
1019-numeric 4/letters I,J
1020-numeric 5/letters K,L
1021-numeric 6/letters M,N
1022-up scroll/letters O,P
1023-numeric 1/letters A,B
1024-numeric 2/letters C,D
1025-numeric 3/letters E,F
1026-down scroll/letters G,H

DESCRIPTION—MAIN EMBODIMENT
(NARRATIVE OF THE STRUCTURE)

FIG. 7 shows the side view of the remote watch. The digital clock 701 located on the outside surface of the hinged body 705 will display watch information such as the time and date. The interior display screen 702 located on the base 706 of the watch remote will display the time and alternative watch functions (calendar, schedule, etc.). The interior display screen 702 is displayed when the hinged body 705 is opened. The display screen 703 located on the inside of the hinged body 705 will display feedback of various car functions. For example, if the armed button is pressed, the display screen 703 will display feedback information for the car alarm functions related to arming the vehicle.

FIG. 8 shows the same version of the watch from a frontal/top view displaying the entire hinged body 805, the hinge 827 whereby the said hinged body 805 will be able to be attached to the base 806 and flip upward showing the interior components. The entire hinged body 805 that contains an outside digital clock display 801, an interior display screen 803, and base 806. The said hinged body 805 is preferably made of stainless steel and has a thickness less than that of the base 806. The outside display clock 801 will preferably be a liquid crystal display screen, where the width of the screen will be the same as the interior display screen 802. The length of the said outside display clock will be less than half of the interior display screen or at least 1.0 cm long. The interior display screen 802, a display screen 803, and a keypad 804 are visible when the said hinged body 805 is opened by pressing the hinged body open button 810. Both the interior display screen 802 and the other display screen 803 will also be liquid crystal display screens. Display screen 802 will show the functions of the car alarm (ex. If the alarm is armed or disarmed, remote started, sunroof open/closed, etc.). Said display screen 803 is shown directly below the said display screen 802 as seen in FIGS. 7 and 8. Display screen 803 will display the time, date, and calendar that are accessed through the use of the mode button 807. The light button 809 will be used to activate the background light for all display screens. With the select button 808, the user will have the ability to activate the menu options.

OPERATION—MAIN EMBODIMENT (HOW IT WORKS)

Explanation of Circuits

Figures 3, 4, 5, & 6

This design assumes the main source of power is a 3 V DC supply for a watch circuit and for a remote control transmitter circuit. It is assumed that eight single-post-single-single-throw switches are available, each connected to some switched circuit and each with a low voltage terminal and a high voltage terminal. The circuit works for a low voltage terminal post that is approximately at ground potential and for small AC signals at open-circuited switch terminals. The $L^{th}$ pair of switch lines are connected to an impedance ($Z_{SDL}$) that models the $L^{th}$ switched circuit, $L \in \{1, 2, \ldots, 8\}$.

Figure 3

By assumption, eight switches are available from two systems: the watch and the remote control transmitter 300. The switching circuitry 301 enables the controlling and operating means of the watch and security system functions by the selection of any one of the eight pairs of lines 304 across which a switch can be placed. This selection occurs by placing a three-bit binary address on the switch select lines 304. In addition, the switching circuitry 301 develops an electronic switch that opens and closes, placing it across the selected pair of lines (the $L^{th}$ lines).

Figure 4

Normally a mechanical SPST switch with two terminals is connected to a "switched circuit 400." This switch is removed, replaced by an electronic switch 403. The electronic switch 403 consists primarily of an enhanced metal oxide semiconductor field effect transistor (EnMOSFET). The EnMOSFET switch consists of a source 403a, gate 403b, and drain 403c. The EnMOSFET AC Switch (EACS) circuit indirectly connects the high 402 and low 401 terminals of the switch for small AC signals. The 2 kΩ resistor 404 on the drain provides on-state protection, and determines a DC quiescent point.

Figure 5

A & B

FIG. 5a shows the EnMOSFET switch connected to the AC output 500a. When the gate voltage of the EnMOSFET switch is high 501a (~3 V), turning the transistor on, an AC ground exists on the drain 505a terminal of the FET placing the drain 505a and source 506a at approximately the same potential. FIG. 5b is the closed circuit condition of the electron switch. When the gate voltage is low 502b, AC current flow discontinues resulting in an open circuit or the open electron switch 503b condition. The 2 kΩ resistor 504b on the drain provides on-state protection, and determines a DC quiescent point.

Figure 6

This design assumes the main source of power is a 3 V DC 600 supply for a watch circuit 602 and for a remote control transmitter 601 circuit. It is assumed that eight single-post-single-single-throw switches are available, each connected to some switched circuit and each with a low voltage terminal (603b & 604b) and a high voltage terminal (603a & 604a). The switching circuitry primarily consists of the EACS 609 and two multiplexers. Two 8-to-1 multiplexers operate in parallel sharing the same address lines (switch select lines). One multiplexer 611 selects the high potential terminal of the $L^{th}$ switch and the other 612 selects the low potential terminal. The EACS 609 produces the opening and closing actions of the switch.

Operation

Figure 2

Watch Transmitter

The remote watch car alarm system includes the watch (see FIG. 2) and an onboard control module (see FIG. 1). The watch that is worn by the vehicle owner/operator consists of an LCD screen 202, operational keypad 201, code generator 210, mode controller 209, memory 203, timer 208, transceiver 211, and buzzer 206. The onboard module (see FIG. 1) will consist of a controller processing unit 100 or a microprocessor program controller, timer 105, memory unit 104, transceiver 108, proximity detector 107, sensor zone circuitry 106, input interface 109, and an output interface 110.

Referring to the schematic block diagram of FIG. 2, the remote watch includes a liquid crystal display 202 for displaying such information as the time, date, Mode State of the watch, and preset alarm times. The said watch will also include an operational keypad 201 for entering a variety of functions including, information for the date and time or car security functions such as arm/disarm, remote start and etc.

The control section 207 of the watch has a mode controller 209, code generator 210, and an alarm timer 208. The mode controller 209 sets the mode in which the watch will operate. The code generator 210 inputs code data 212 to the circuitry of the transceiver 211. The timer 208 will cause the mode controller 209 to switch back to the watch setting (mode) after a car security button is pressed on the keypad 201. The timer 208 will then alert the user when an alarm time is activated via the buzzer 206. As would be readily understood by those skilled in the art.

The digital remote watch further includes memory (203) and a buzzer (206). The memory 203 will be used for storage of data such as the set alarm generating time (wake-up alarm), the mode being currently affected, the month, day, year data, and the time (hour/minute). The buzzer 206 will chirp with the corresponding car security functions (ex. arm/disarm) as well as with (wake-up) alarm settings.

Operation

Figure 1

Onboard Control Module

Referring to FIG. 1, the operational signal 103 from the digital watch remote 102 is received by the external antenna 101 then the transceiver 108 receives the amplified signal from the transmitting/receiving antenna 101 and feeds the received operational signal to the proximity detector 107. The proximity detector 107 verifies the interrogating signal, detects the level of received operation signal, generates a proximity signal when the signal is above a predetermined level, the detector then feeds the proximity signal to the controller processing unit 100.

The controller-processing unit 100 generates a series of control signals or pulses as its outputs. These include activities such as locking the doors and arming the system. For example, arming the system causes a flash of the automobile parking lights 125, a single chirp from the siren 126, and causing the flashing the interior LED 124 status indicator to activate. Additionally, arming the system causes the starter 118 to be cut and if the interior dome light 123 is on, to turn it off, as would be readily understood by those skilled in the art.

The timer component 105 measures a preset time and is set and/or reset under the control of the controller-processing unit 100. The memory 104 functions as an internal memory for the controller-processing unit 100 or as an auxiliary memory for other components or devices incorporated in the system. Data writing to or reading from the memory is performed under the control of the controller-processing unit 100. This is readily understood by those skilled in the art.

As illustrated, the input interface 109 is connected to various vehicle inputs including an ignition switch 111, trunk switch 112, hood switch 113, door switches 114, key in ignition switch, pre-warn sensor, valet switch 115 and zone sensors 106. The sensor zone circuitry 106 performs the security function of the automobile. When the sensor zone circuitry 106 detects tampering, it generates a signal and feeds it directly to the controller-processing unit 100. As would be readily understood by those skilled in the art, other inputs are also contemplated by the present invention and are described by the term sensor.

The output interface 110 of the controller-processing unit 100 can be connected to a variety of output devices. The outputs may include and not limited to auxiliary relays such as window control 116 or remote start 121, as would be readily understood by those skilled in the art. Other outputs include a panic output 117, starter kill 118, disarm/arm outputs 119/120, dome light 123, parking lamps 125, siren 126, alphanumeric character display 122, and valet/dashboard red or green emitting LED's 124.

Operation

Figure 9

Basic Design

FIG. 9 shows a prototype of the watch from a top view and a side view showcasing buttons for the security system and display screen. The manner of using the watch remote security system is simple, the security system can be armed by pushing the arm button 905 and disarmed by pushing the disarm button 902. The panic button 903 will cause the alarm to sound when pushed. The mode button 907 will enable a person to change the time/date. The light button 901 will illuminate the display screen(s).

Operation

Figure 10

The user can switch the function of the watch using the directional buttons 1022 & 1026 to navigate through the menu options, and the select button 1010 or the tri-functional button 1018 will be used to select a particular menu option.—The remote start button 1011 will start the user's vehicle; arm/lock button 1012 will arm the security system and lock the user's vehicle. The disarm/unlock button 1013 will disarm the car security system and unlock the vehicle; the panic button 1014 will cause the car security alarm to activate when depressed.—Reference numerals 1015–1021 are alpha/numeric buttons which are used for inputting numbers/letters for the setting of time, date, names, changing the date, telephone numbers, etc. Reference numerals 1022 & 1026 are the alpha/directional buttons, which navigate the user through the digital security watch's menu functions. Button 1018 is a tri-functional button that allows the user to select a menu option, input the number 0, or the letters XYZ.

CONCLUSION, RAMIFICATIONS, AND SCOPE OF INVENTION

The remote watch security system provides a very reliable, economical device that can be used by persons of almost any age, linking the individual to his/her vehicle at all times, giving feedback on the condition of the vehicle and vibrating or beeping to alarm the individual that their vehicle is being tampered with. While the above description contains many specificities, these should not be construed as limitations on the scope of the invention, but rather as an exemplification of one preferred embodiment thereof. Many other variations are possible that we did not consider important enough to show in drawing and describe in detail in our description. For example, this device can have minor variations in color, size, and materials. Furthermore, the digital watch can have variations in these areas:

the wrist bands can be synthetic in different colors, or metallic (ex. Titanium)

the entire watch transmitter can be metallic the display screen can light in various colors (ex. Red, green, yellow etc.)

entire watch remote can be hard plastic with a synthetic band the watch transmitter can be made in various shapes and sizes (ex. Round, rectangular, square etc.)

the hinged body can have an outer digital display clock or not the watch transmitter can have a flip up component or not the hinged body can have an analog watch face with short hand and long hand on the outer part of the hinged body and a display screen on the interior part of the hinged body the keypad can be arranged in many ways and the buttons can be in various shapes, sizes, and made from different materials (rubber, plastic, metal alloy, etc.)

the keypad can be used for various functions related to the watch and the security system the outer buttons on the sides of the watch transmitter can be in different shapes, sizes and colors and can be used for various functions the range in which the watch remote can control the security system can be changed (ex. extended for longer range)

the watch transmitter can incorporate different trademarks and logos of designer watch, clothing, and automotive manufacturers the watch transmitter can have automatic sliding components the watch transmitter can have voice commands (ex. through the use of voice command the security system can be armed/locked, disarmed/unlocked, remotely started etc.)

the display screen can be in various sizes the program of the watch can have a menu selection screen with various options to cycle through the digital watch remote will be able to operate other power functions for different vehicles (ex. Power rear gate and power side sliding doors for mini-vans).

The battery can be a rechargeable Ni—Cd battery that allow for extended battery life and lower maintenance cost for the user.

Watch transmitter can be solar powered

What is claimed is:

1. A vehicle security system comprising:
   (a) a wristwatch remote comprising a housing base containing operating electronics and a plurality of control means for adjusting watch functions and controlling security system functions; a keypad; a voice activation control mechanism; a speaker; a display panel being located on a front surface of said housing base proximate said keypad; a mechanism with a plurality of means for alerting user of vehicle tampering; transceiver, code generator, switching circuit, mode controller, memory and audio input/output device; a programmed menu; means for transmitting operational signals between wristwatch remote and onboard control module;
   (b) a hinged-body connected to said housing of wristwatch remote, a plurality of display screens located on said hinged-body displaying digital readouts;
   (c) a hinged-body operating mechanism on wristwatch remote;
   (d) a hinge mechanism on wristwatch remote;
   (e) onboard module comprising vehicle sensors for detecting vehicle tampering within specific senor zones, controller processing unit, memory unit, timer, antenna, input interface switches, input interface, output interface, transceiver and proximity detector.

2. The security system of claim 1 wherein said means for transmitting operational signals between said onboard control module and said wristwatch is done so by infrared/radio frequency.

3. The security system wristwatch remote of claim 1 wherein said means for alerting user includes an audible alarm means that is audibly annunciated when initiated by said vehicle security system in wireless communication with a vehicle security system.

4. The security system wristwatch remote of claim 1 wherein said means for alerting user includes a vibration alarm means that is activated by said vehicle security system in wireless communication with a vehicle security system.

5. The security system wristwatch remote of claim 1, wherein said mode controller contains means for setting said security system wristwatch's operational mode, via switching circuitry between wristwatch and security system.

6. The security system wristwatch remote of claim 1, wherein said code generator contains means to generate and input code data into said transceiver.

7. The security system wristwatch remote of claim 6 wherein said transceiver will transmit the encoded data by RF or Infrared to said onboard control module.

8. The security system wristwatch remote of claim 1, wherein said memory will store data for alarm, time, current operating mode, and calendar, month day and year.

9. The security system wristwatch remote of claim 1, wherein said audio input/output device will audibly annunciate with corresponding security system and wristwatch alarm settings.

10. The security system wristwatch remote of claim 9 wherein said audio input/output device will trigger security system functions when audible commands are annunciated causing the system to activate or deactivate.

11. Security system wristwatch remote of claim 1 wherein said housing base comprising a housing base interior display panel, proximate to said keypad, displays time/date in a variation of arrangement.

12. Security system wristwatch remote of claim 1 wherein said security system wristwatch remote comprises of a plurality of control means for operating the functions of the security system.

13. The security system wristwatch remote of claim 1 wherein said hinged-body comprising a plurality of display screens comprises of an exterior display screen and an interior display screen.

14. The security system wristwatch remote of claim 13 wherein said display screens displays time/date and security system alarm information in a variation of arrangements telling the wearer the current status of vehicle.

15. The security system wristwatch remote of claim 1, wherein said hinged-body connected to said hinge mechanism for pivotal motion relative to said housing is pivoted towards rear of housing base stopping at a predetermined angle.

16. The security system wristwatch remote of claim 1, wherein said operating mechanism for said hinged body is the means for biasing said hinged-body toward a rearwardly pivoted position, and effectuating a controlled pivotal motion of said hinged-body structure between the closed position thereof covering said display screen and the rearwardly pivoted position exposing said display screen located on housing base and display screen on said hinged body.

17. The security system wristwatch remote of claim 16, wherein spring-biased switch means are mounted in said housing base for engaging said hinged-body so as to normally maintain said hinged-body in a latched position over said display screen, said switch means being manually operable to release said hinged-body portion and facilitate rearward pivotal motion thereof responsive to the operative force imparted to said hinged-body structure by said hinged-body operating mechanism.

18. The security system of claim 1 wherein said vehicle sensors is the means for detecting tampering of vehicle sensor zones and generating an operational signal, relaying operational signal to said central processing unit, then transmitting to wearer of said wristwatch.

19. The security system of claim 1, wherein said proximity sensors is the means for detecting a body in close proximity of the vehicle and generating an operational signal, relaying operational signal to said central processing unit, then transmitting to wearer of said wristwatch.

20. The security system wristwatch remote of claim 1, wherein said speaker is the means for communicating an audible alarm to alert the user of vehicle tampering.

21. The security system wristwatch remote of claim 1, wherein said menu is the means for accessing options that can be chosen by the user to adjust time/date, check status of said security system and vehicle.

22. The security system wristwatch remote of claim 1, wherein said voice activation control mechanism is the means for verbally operating the functions of said security system and vehicle by speaking a command into said wristwatch remote.

* * * * *